(12) United States Patent
Schott et al.

(10) Patent No.: US 12,505,689 B2
(45) Date of Patent: Dec. 23, 2025

(54) DOCUMENT TYPE DETECTION DURING UPLOAD PROCESS

(71) Applicant: Capital One Services, LLC, McLean, VA (US)

(72) Inventors: Suranya Jayan Schott, Arlington, VA (US); James Brighter, Reston, VA (US); John Maillett, Vienna, VA (US); Keegan Franklin, Tucson, AZ (US)

(73) Assignee: Capital One Services, LLC, McLean, VA (US)

( * ) Notice: Subject to any disclaimer, the term of this patent is extended or adjusted under 35 U.S.C. 154(b) by 303 days.

(21) Appl. No.: 18/092,622

(22) Filed: Jan. 3, 2023

(65) Prior Publication Data
US 2024/0221409 A1    Jul. 4, 2024

(51) Int. Cl.
| | |
|---|---|
| *G06V 30/224* | (2022.01) |
| *G06V 30/10* | (2022.01) |
| *G06V 30/19* | (2022.01) |
| *G06V 30/42* | (2022.01) |

(52) U.S. Cl.
CPC .......... *G06V 30/2253* (2022.01); *G06V 30/10* (2022.01); *G06V 30/19147* (2022.01); *G06V 30/42* (2022.01)

(58) Field of Classification Search
CPC ......... G06V 30/2253; G06V 30/19147; G06V 30/42; G06V 30/10
See application file for complete search history.

(56) References Cited

U.S. PATENT DOCUMENTS

| | | | |
|---|---|---|---|
| 5,937,084 A | 8/1999 | Crabtree et al. | |
| 6,963,665 B1* | 11/2005 | Imaizumi | G06V 30/1444 382/229 |
| 9,466,014 B2 | 10/2016 | Gorski et al. | |
| 9,558,463 B2 | 1/2017 | Ross et al. | |
| 10,095,925 B1* | 10/2018 | Tripuraneni | G06V 30/12 |
| 10,402,790 B1 | 9/2019 | Clark et al. | |
| 11,068,976 B1* | 7/2021 | Voutour | G06Q 20/386 |
| 11,151,369 B2 | 10/2021 | Nepomniachtchi et al. | |

(Continued)

FOREIGN PATENT DOCUMENTS

| | | | | |
|---|---|---|---|---|
| WO | WO-2021260684 A1 * | 12/2021 | | G06F 16/35 |

OTHER PUBLICATIONS

International Search Report for International Application No. PCT/US24/10190, mailed on Apr. 17, 2024, 7 pages.

*Primary Examiner* — Amandeep Saini
*Assistant Examiner* — Daniella M. DiGuglielmo
(74) *Attorney, Agent, or Firm* — Sterne, Kessler, Goldstein & Fox P.L.L.C.

(57) ABSTRACT

Systems for document type detection during a document upload process are disclosed. Character recognition processes are performed on images of a document being uploaded to a backend system. The character recognition processes may identify different subsets of characters in the document which are used to identify the document type. Subsets of characters may include keywords and account characters and each subset may be processed by a different character recognition process. One or both of the subsets of characters may be used to identify the document type and the identified document type may be used to decide whether to proceed with the document upload process.

20 Claims, 3 Drawing Sheets

(56) References Cited

U.S. PATENT DOCUMENTS

| | | | |
|---|---|---|---|
| 2008/0152209 A1* | 6/2008 | Kosek | G06V 30/412 |
| | | | 382/137 |
| 2014/0270465 A1* | 9/2014 | Gorski | G06V 30/40 |
| | | | 382/137 |
| 2022/0067365 A1 | 3/2022 | Agrawal et al. | |
| 2022/0156488 A1* | 5/2022 | Mokhtari | G06F 40/284 |

* cited by examiner

DOCUMENT TYPE DETECTION DURING UPLOAD PROCESS

TECHNICAL FIELD

Aspects relate to systems and methods for detecting a document type during an upload process using optical character recognition (OCR).

BACKGROUND

Currently, computer-based (e.g., laptop) or mobile-based (e.g., mobile device) technology allows a user to initiate a document upload process for uploading images or other electronic versions of a document to a backend system (e.g., a document processing system) for various purposes. In some cases, the backend system is configured to accept only certain types of documents for the upload process. For example, the backend system may only support processing of particular financial documents involving negotiable funds such as checks or travelers checks but not those involving non-negotiable funds such as deposit slips or tickets. For a backend system that processes millions of documents, speed and accuracy is critical when determining the document types and whether they are supported by the backend system.

SUMMARY

Provided herein are system, method, and/or computer program product embodiments, and/or combinations and sub-combinations thereof for detecting document types during a document upload process.

An example method embodiment may include steps for detecting a document type of a document during a document upload process. The steps may include a backend system receiving an image comprising image data representing the document from a mobile device and initiating one or more character recognition engines for detecting information in the image data. For example, the backend system may include a first character recognition engine performing a first detection process of the image data to detect a keyword in the image data. The first detection process may identify or predict a document type of the document based on the keyword. The backend system may also include or communicate with a second character recognition engine. The backend system may receive a plurality of numeric characters or account characters identified in the image data from the second character recognition engine. The backend system may perform a verification of the identified (predicted) document type as an accepted document type using the plurality of numeric characters to verify the identified document type as being correctly detected. After verifying that the document type is supported, the backend system may permit the document upload process to continue. After verifying that the document type is not supported, the backend system may transmit a notification to a mobile device indicating that the identified document type is not an accepted document type, and may further cancel the document upload process.

Certain aspects of the disclosure have other steps or elements in addition to or in place of those mentioned above. The steps or elements will become apparent to those skilled in the art from a reading of the following detailed description when taken with reference to the accompanying drawings.

BRIEF DESCRIPTION OF THE DRAWINGS

The accompanying drawings, which are incorporated herein and form a part of the specification, illustrate aspects of the present disclosure and, together with the description, further serve to explain the principles of the disclosure and to enable a person skilled in the pertinent art to make and use the disclosure.

In the drawings, like reference numbers generally indicate identical or similar elements. Additionally, generally, the leftmost digit(s) of a reference number identifies the drawing in which the reference number first appears.

DETAILED DESCRIPTION

Figure 1:
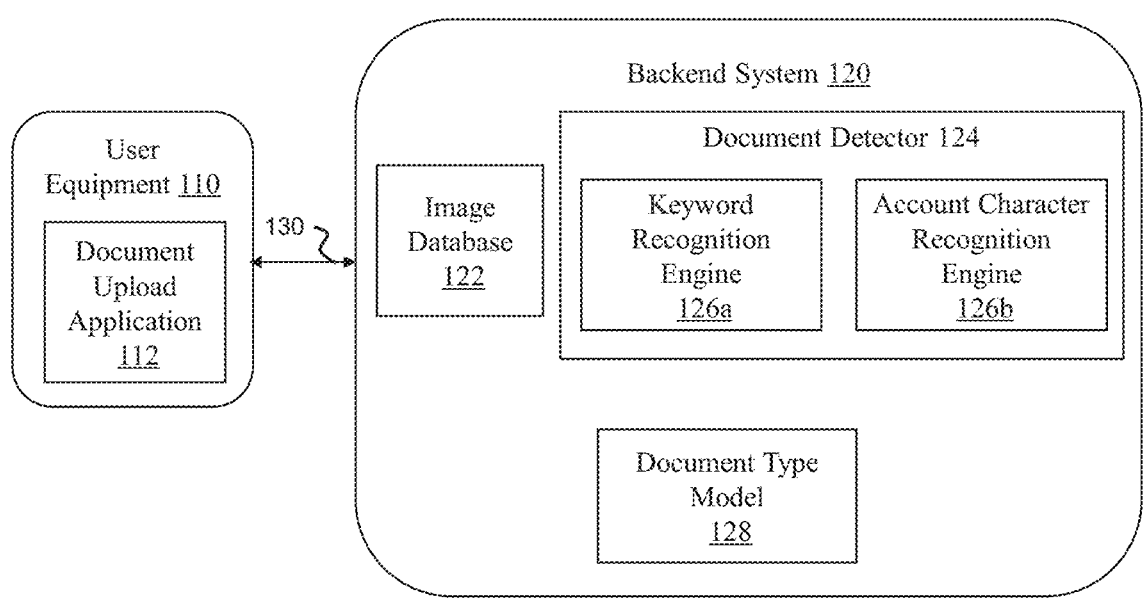
FIG. 1 is an exemplary document upload environment for providing mid-stream adjustments to a document upload process according to aspects of the present disclosure.

The following aspects are described in sufficient detail to enable those skilled in the art to make and use the disclosure. It is to be understood that other aspects are evident based on the present disclosure, and that system, process, or mechanical changes may be made without departing from the scope of an aspect of the present disclosure.

In the following description, numerous specific details are given to provide a thorough understanding of aspects. However, it will be apparent that aspects may be practiced without these specific details. To avoid obscuring an aspect, some well-known circuits, system configurations, and process steps are not disclosed in detail.

The drawings showing aspects of the system are semi-diagrammatic, and not to scale. Some of the dimensions are for the clarity of presentation and are shown exaggerated in the drawing figures. Similarly, although the views in the drawings are for ease of description and generally show similar orientations, this depiction in the figures is arbitrary for the most part. Generally, the system may be operated in any orientation.

Certain aspects have other steps or elements in addition to or in place of those mentioned. The steps or elements will become apparent to those skilled in the art from a reading of the following detailed description when taken with reference to the accompanying drawings.

System Overview and Function

Provided herein are a method, a system, computer program product embodiments, and/or combinations and sub-combinations thereof for providing utilizing optical character recognition (OCR) for detecting types of documents being uploaded during a document upload process.

In some embodiments, the technology described herein provides a system that detects the type of document(s) being uploaded to a backend system. In one embodiment, the backend system may be a remote check deposit platform that receives images of checks—front and back—from a customer device such as a mobile phone. The OCR can be used to identify keywords and other character information in the document that is then used to identify the type of the document. Examples of keywords include predefined alphanumeric strings such as "check," "money order," "traveler's check" and examples of character information include an account number or a routing number. Some information, such as the character information may be located at an expected location on the document such as the bottom portion of the document. In some embodiments, the system may use a combination of character recognition techniques in a two-step process to identify the document type during a document upload process. For example, the system may use a keyword recognition technique that generates a prediction of the document type based on matching recognized alphanumeric characters in the document and then uses an account character recognition technique to identify other characters in the document located at an expected location of the document (e.g., account number) to verify the prediction. As another example, the system may reverse the techniques and use the account character recognition technique to generate the prediction and the keyword recognition technique to verify the prediction. The document upload process may require a user to upload one or more documents in regards to various applications. For example, the document upload application may allow users to upload certain documents to a backend system with respect to their user account such as a check or a traveler's check. The backend system may implement restrictions on the types of documents that can be uploaded such as non-negotiable documents like money orders or deposit slips. The backend system may use techniques described herein to detect a document type during a document upload process and continue or quit the document upload process on the basis of the detection.

The technology described herein solves one or more technical problems that exist in the realm of online computer systems and in particular, with document upload processes that do not accurately and efficiently identify document types during an upload process. This problem with conventional upload processes is rooted in the typical communications between a document upload application installed on a user equipment and a backend system where the document type detection may occur in a third party system separate from the document upload application or the backend system. An example computer system may utilize multiple components working together to provide document upload services. Examples of these components include a client device, a backend system that implements an application programming interface (API) that enables communications between the client device and the backend system, and third-party systems that may be configured to perform functions associated with the uploaded document such as OCR and validation. In some embodiments, the client device may be implemented as any mobile device having a document upload application installed. In some embodiments, the API may be implemented with a number of components that interface with the document upload application, process images and other information provided from the client via the document upload application.

The technology as described herein provides an improvement in the communications between the document upload application and the backend system and documents to be identified during the upload process. One or more solutions described herein are necessarily rooted in computer technology through the modification of communications between the document upload application and the backend system, and specifically to how the document upload application and the backend system interact with each other. The technology described herein reduces or eliminates the problem of conventional document upload processes as will be described in the various embodiments of FIGS. 1-3.

Various embodiments of these features will now be discussed with respect to the corresponding figures.

FIG. 1 is an exemplary document upload environment 100 for detecting a type of a document being uploaded during a document upload process (e.g., in connection with a remote deposit) according to aspects of the present disclosure. In one example, environment 100 comprises user equipment 110 and backend system 120.

In an exemplary embodiment, user equipment 110 may be implemented as a mobile device such as a smartphone or a tablet. User equipment 110 may include a document upload application 112 that is configured to connect with backend system 120, which may include an image database 122, a keyword recognition engine 126*a*, an account character recognition engine 126*b*, and document type model 128. User equipment 110 may connect to backend system 120 over a network connection 130, which may be implemented via a network such as the Internet or a cloud network.

Document upload application 112 may be configured to display a graphical user interface on user equipment 110. The graphical user interface may provide the ability to receive images of documents being uploaded to backend system 120. Document upload application 112 may include a camera function that utilizes a camera (not shown) of user equipment 110 to capture one or more images of a document being uploaded to the backend system 120.

Techniques of the present disclosure provide a number of improvements over a conventional document type detection process where the type of document is detected after receiving all document images of the document being upload. Additionally, prior art systems typically rely on the backend system transmitting an explicit instruction (e.g., to a third party system) to perform the detection process. For example, when implemented in the context of a mobile deposit process, the third party system will receive the document images and an instruction to identify the document type. In the present disclosure, instead of waiting for instructions to initiate the document type detection process by a third party system, document upload application 112 may be configured to initiate the document type detection process either at user equipment 110, at backend system 120, or a combination of both.

In embodiments where the backend system 120 performs the document type detection process, document upload application 112 may start a document upload process which includes automatically transmitting image data of the document upon capturing the images and before receiving any user input to either initiate the upload process or transmit the images to the backend system 120. Automatic transmission of the document images to backend system 120 enables the backend system 120 to initiate the document type detection process during the document upload process. Backend system 120 includes document detector 124 which receives the image data, detects the document type of the document being uploaded, and an indication whether the detected document type is supported by the backend system 120. If the document type is not supported, backend system 120 may return a message to document upload application 112 indicating that the document is not supported. Backend system 120 may also send a signal to document upload application 112 cancelling the upload process. If the document type is supported, backend system 120 permit the upload process to continue.

Document detector 124 may include keyword recognition engine 126*a* and account character recognition engine 126*b*. Keyword recognition engine 126 may perform a keyword recognition process for identifying predefined alphanumeric character strings in the document images. In some embodiments, keyword recognition engine 126*a* is an optical character recognition (OCR) engine that recognizes alphanumeric characters in documents. Account character recognition engine 126*b* may perform an account character recognition process for identifying account characters in the document. In some embodiments, the account characters may be located at an predefined location in the document. In some embodiments, character recognition engine 126b is configured to specifically identify account characters, such as the magnetic ink characters on a check, in documents where the account characters may be characterized based on the specific location within a document. For example, the document may include a magnetic ink character recognition (MICR) line which includes numeric characters representing a routing number associated with the document. In some embodiments, keyword recognition engine 126a and account character recognition engine 126b may be implemented as a single engine that performs the functions described above.

In an embodiment when the document being uploaded is a check, the backend system may receive one or more images of a document being uploaded to a user account maintained by the backend system and that is associated with the document upload application. The backend system may include components for recognizing characters of the document during the document upload process and detecting the document type based on the recognized characters. The user account may be bank account (e.g., checking or savings) into which funds specified by the check are to be deposited. There may be different subsets of characters recognized by the backend system that require different character recognition tools. For example, one character recognition tool, such as an OCR tool, may be configured to identify one subset of characters that are associated with a predefined alphanumeric string that identifies the document type, such as characters that specify that the document is a type of financial instrument such as a check, a money order, a deposit slip, traveler's check, or a savings bond, just to name a few examples. Another character recognition technique, such as one that is configured to detect account information, may be configured to identity another subset of characters in the document that are configured in a specific format such as a routing number and an account number associated with a financial institution that issued the document. In some embodiments, one subset of characters may be identified as a predefined characters that are matched to a set of predefined strings (e.g., "check," "money order"). In some embodiments, another subset of characters may be identified as account characters that are used to identify an account associated with the document. Accordingly, in some embodiments, subsets of characters may refer to different identifying information on the document. Examples of subsets include a subset that includes information associated with the document type, a subset that includes information associated with a user that is associated with the document to be uploaded, and a subset that includes information associated with a backend system that provided the document.

In some embodiments, backend system 120 may implement rules for permissible or impermissible document types. For example, permissible document types may be certain financial document types, such as those involving negotiable funds, and are identified by certain keywords and account numbers on the document. Impermissible document types may be certain financial document types, such as those involving non-negotiable funds, and are identified by other keywords and unknown account numbers or the lack of account numbers on the document.

In some embodiments, document detector 124 may be implemented in a distributed manner where keyword recognition engine 126a and account character recognition engine 126b may be implemented on separate devices connected over a network. For example, keyword recognition engine 126a may be implemented on user equipment 110 or backend system 120 and account character recognition engine 126b may be implemented on a third-party device that is connected to backend system 120. In such an embodiment, account character recognition engine 126b returns the detected account characters for further processing, such as to verify the predicted document type generated by keyword recognition engine 126a. In some embodiments, the detected account characters may be in the form of a string of numeric characters that identify an account associated with the document. In an example where the document is a check, the account characters may identify a routing number associated with the bank.

In some embodiments, document detector 124 may perform the keyword and account character recognition processes sequentially. For example, the document type detection process may first initiate the keyword recognition engine 126a to generate a predicted document type. The prediction may be based on a keyword to document type mapping maintained by backend system 120. For example, keyword recognition engine 126a may use the mapping to retrieve a document type based on the keyword. Next, the account character recognition engine 126b may identify the account characters in the document. Backend system 120 may also maintain a mapping between account characters and document types. The account characters may also indicate that they are associated with a document type. Document detector 124 may then perform a verification of the predicted document type from keyword recognition engine 126a based on the routing number identified by account character recognition engine 126b. As another example, document detector 124 may perform these processes in reverse, i.e., performing the account character recognition process first then using the output of the keyword recognition process as verification.

In some embodiments, document detector 124 may perform the keyword and account character recognition processes in parallel. The identified keywords and account characters may be used together to generate a prediction of the document type. For example, backend system 120 may store a mapping of the keyword and account character to corresponding document types and may retrieve the document type based on the mapping. In embodiments where account character recognition engine 126b may be implemented on a separate device from keyword recognition engine 126a, document detector 124 may transmit image data to account character recognition engine 126b and receives the routing number from account character recognition engine 126b.

In some embodiments, document detector 124 may only perform one of the character recognition processes. For example, the backend system 120 may only require either comparing the predefined strings to the list of known strings or identifying the account characters, but not both, to identify the document type. Backend system 120 may establish a threshold level of confidence to determine whether the document upload process is required to perform both processes for identifying the document type. For example, a first character recognition process may be performed (either the keyword recognition or account character recognition) which results in the document upload process providing a predicted document type. The prediction may be associated with a confidence level that the prediction is accurate. The confidence level may be compared with the threshold level to determine whether to perform the second character recognition process.

In some embodiments, the user equipment 110 and backend system 120 may perform a different character recognition process of the document type detection process in a distributed manner. For example, document upload application 112 may automatically perform the keyword recognition process for recognizing predefined alphanumeric characters in the document images and comparing them to predefined strings associated with different document types. Document upload application 112 may identify a predefined string within the document and compare the identified string with a list of known strings that identify the document as a check, money order, or traveler's check. In embodiments where both processes are to be performed, backend system 120 may then perform the account character recognition process to verify the predicted document type generated by the keyword recognition process. In some embodiments, the account character recognition process may be performed first to generate the prediction and the keyword recognition process may be performed to verify the predicted document type generated by the account character recognition process.

In some embodiments, document upload application 112 may be configured with application programming interface (API) calls for initiating the different character recognition processes of the document type detection process. For example, document upload application 112 may transmit a first API call to initiate the keyword recognition process and a second API call to initiate the account character recognition process. Document upload application 112 may transmit the API calls at any point during the upload process after at least one document image has been transmitted to backend system 120. For example, after document upload application 112 transmits a first document image of the document (e.g., the front of the document) to backend system 120, document upload application 112 may then transmit an API call to initiate either the keyword recognition process or the account character recognition process, or it may transmit a second document image of the document (e.g., the back of the document) and wait to transmit any API calls until all images of the document are transmitted to backend system 120. For the API call (either the API call for the keyword recognition process or the API call for the account character recognition process), document upload application 112 may capture a first image of a document, such as the first page or the front of the document, and a second image of the document, such as additional pages or the back of the document. Document upload application 112 may be configured to trigger the API call immediately upon capturing the first image or wait for subsequent images such as the second image to be captured.

In some embodiments, document upload application 112 may be further configured to modify one or more of the document images to include a request tag that is detected by backend system 120. Upon detection of the request tag, backend system 120 may transmit any received document images to either keyword recognition engine 126a or account character recognition engine 126b. Backend system 120 may decide which engine (and therefore whether keyword recognition or account character recognition is performed first) first receives the document image based on a setting in the request tag, a setting stored in backend system 120, or based on historical data indicating which engine has been more accurate in detecting the document type. The technology disclosed herein may dynamically add the request tag to one or more of the document images that are transmitted to the backend system with the request tag indicating that the document type detecting be performed immediately upon receipt of one or more of the document images.

In some embodiments, the first recognition engine selected by backend system 120 receives the document image(s) transmitted from document upload application 112, performs character recognition (either the keyword or account characters) on the document images, and generates a predicted document type based on the results of the character recognition. In some embodiments, backend system 120 may determine whether the predicted document type is sufficient or whether it needs to be verified by the second recognition engine.

Keyword recognition engine 126a performs character recognition on document images to identify a predefined keyword. Keyword recognition engine 126a may maintain a table associating predefined keywords with document types. For example, predefined keywords may be "check," "money order," or "traveler's check" which are associated with respective document types, a check, a money order, or a traveler's check. Backend system 120 may update the table to include more than one predefined keyword associated with a particular document type. For example, there may be more than one keyword associated with a check, more than one keyword associated with a money order, etc.

Account character recognition engine 126b performs account character recognition on document images to identify account information on documents. Account information differs from keywords because they are generally related to a specific user account and not typically the same (or predefined) for each document. In contrast, keywords are generally the same for each document type. For example, checks may share the same keyword (e.g., "check") but have different account information. Account information may also be located in a predefined location for each document such as the bottom portion of a document. In some embodiments, account character recognition engine 126b may maintain a table associating account information with document types. In some embodiments, account character recognition engine 126b may submit a query that includes the recognized account information to a database, which may identify the document type based on the account information, and which may then respond to the query indicating the identified document type.

In aspects, the backend system 120 may be implemented as one or more servers. Backend system 120 may be implemented as a variety of centralized or decentralized computing devices. For example, backend system 120 may be a mobile device, a laptop computer, a desktop computer, grid-computing resources, a virtualized computing resource, cloud computing resources, peer-to-peer distributed computing devices, a server farm, or a combination thereof. Backend system 120 may be centralized in a single device, distributed across multiple devices within a cloud network, distributed across different geographic locations, or embedded within a network. Components of backend system 120, such as image database 122, keyword recognition engine 126a, account character recognition engine 126b, and document type model 128 may be implemented within the same device (such as when backend system 120 is implemented as a single device) or as separate devices (such as when backend system 120 is implemented as a distributed system with components connected via a network).

Image database 122 in backend system 120 may be implemented as network storage resources (e.g., Amazon S3®, Storage Area Network (SAN), Network File System (NFS), etc.) and is configured to store document images received from document upload applications.

Document type model 128 in backend system 120 may be a machine learning model trained to assist keyword recognition engine 126a by providing information regarding likely keywords and locations of those keywords within documents corresponding to different document types. Document type model 128 may be trained to assist keyword recognition engine 126a in identifying relevant keywords associated with document types. Document type model 128 may be trained based on images provided by document upload application 112 or by multiple document upload applications 112 installed across multiple user equipment. Machine learning model 128 may maintain and update a list of keywords associated with each document type. In some embodiments, document type model 128 may also be trained to identify locations of the keywords within each document type. For example, a keyword "check" may appear in particular locations of a check. In some embodiments, document type model 128 may also identify locations of keywords based on account information listed on the document. For example, the keyword "check" may appear in a particular location of a check for one bank but in a different location of a check for another bank. Document type model 128 may provide some or all of this information—keyword (s) to document type mapping, the locations of keywords based on the document type, the locations of keywords based on the account information on the document, the locations of keywords based on both the document type and the account information—to keyword recognition engine 126a which may use the information to more accurately identify keywords within the document. Backend system 120 may continually update the mappings by training document type model 128 based on new image data received from multiple document upload applications installed across different user equipment.

The components described in FIG. 1 may be implemented as instructions stored on a non-transitory computer readable medium to be executed by one or more computing units such as a processor, a special purpose computer, an integrated circuit, integrated circuit cores, or a combination thereof. The non-transitory computer readable medium may be implemented with any number of memory units, such as a volatile memory, a nonvolatile memory, an internal memory, an external memory, or a combination thereof. The non-transitory computer readable medium may be integrated as a part of the environment 100 or installed as a removable portion of the environment 100.

Environment 100 can be used in a variety of areas implementing document upload techniques. These include financial applications, security applications, etc. where documents being uploaded into user accounts may be subject to fraudulent activity. For example, when processing important document such as driver's licenses, checks, financial documents, etc. The environment 100 allows for more accurate determination of document types of uploaded documents during a document upload process.

Methods of Operation

Figure 2:
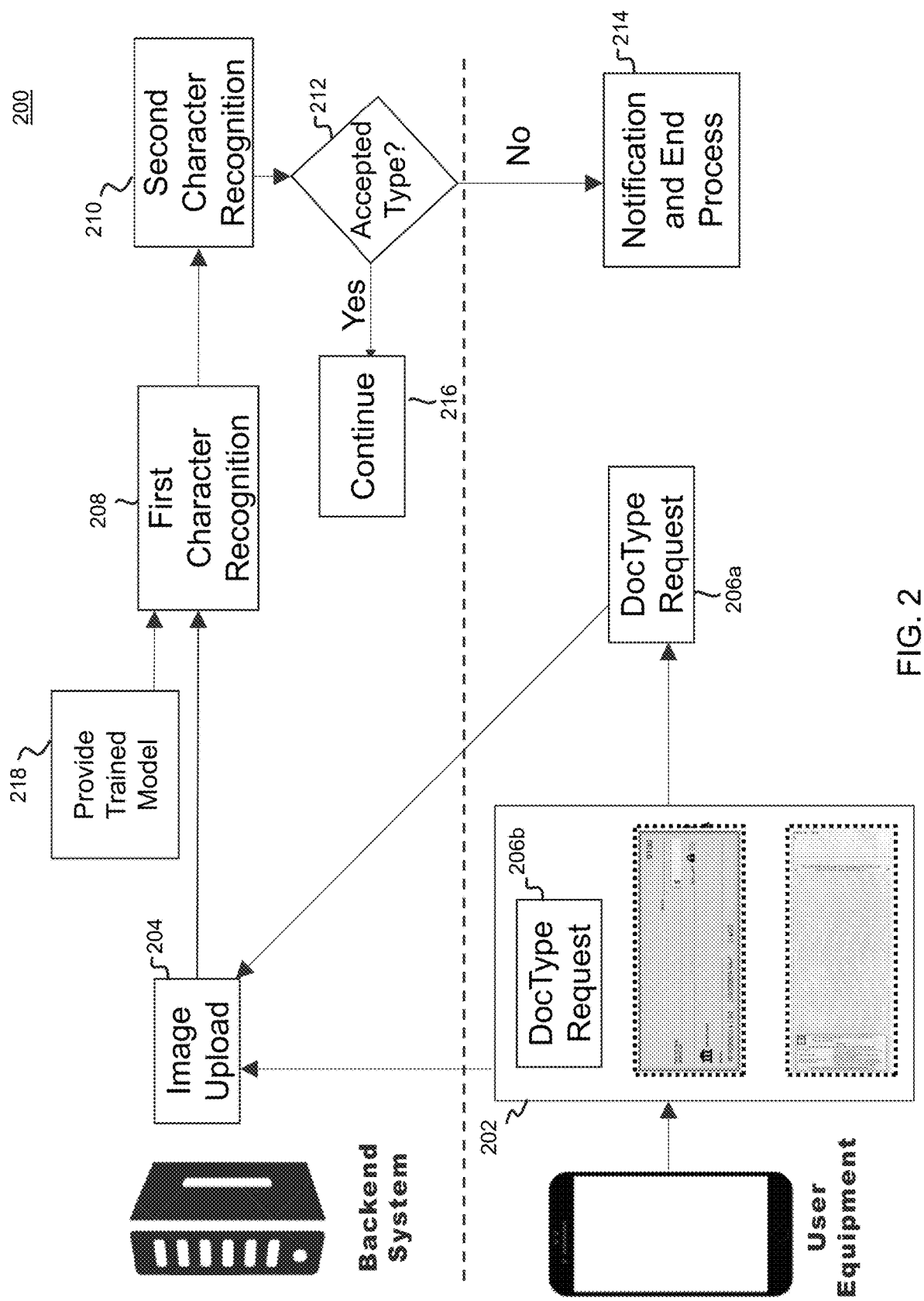
FIG. 2 is an example method of a document upload process that includes performing instant optical character recognition of a document according to aspects of the present disclosure.

FIG. 2A is an example method 200 of operating the environment 100 to perform document type detection of document images being uploaded to a user account maintained by backend system 120, according to aspects of the present disclosure. As a non-limiting example with regards to FIG. 1, one or more processes described with respect to FIG. 2 may be performed by one or more devices of environment 100. In such an embodiment, the one or more devices of environment 100 may execute code in memory to perform certain steps of method 200. While method 200 of FIG. 2 will be discussed below as being performed by one or more components of environment 100, other devices not shown may store the code and therefore may execute method 200 by directly executing the code. Accordingly, the following discussion of method 200 will refer to devices of FIG. 1 as an exemplary non-limiting embodiment of method 200. Moreover, method 200 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 2, as will be understood by a person of ordinary skill in the art(s).

At step 202, document upload application 112 installed in user equipment 110 receives image data of a document, such as by controlling a camera on user equipment 110. The image data represents one or more images of the document that are needed by backend system to complete the document upload process. In some embodiments, the image data may include a front and back capture of a single page document, such as the front and back of a check. In some embodiments, the image data may include multiple images of the pages of a multi-page document or different documents being uploaded together. In some embodiments, document upload application 112 may be configured with a parameter indicating the number of document images to be captured of the document being uploaded. For example, the graphical user interface provided by document upload application 112 may be configured to require capturing both a front image of the document and a second image of the document based on the number of images that are needed by backend system 120 to process the document.

At step 204, document upload application 112 transmits the image data to backend system 120, which may cache the received images in a temporary location such as an S3 bucket implemented with a cache control.

At step 206a, document upload application 112 transmits a document type request with the image data to backend system 120 to detect the document type based on the image data uploaded at step 204. In some embodiments, the document upload application 112 may modify image data to include the document type request which is detectable by backend system 120. Document upload application 112 may transmit the modified image data of the document to backend system 120. For example, document upload application 112 may modify image data of the front of a check or image data of the back of the check to include the request tag before transmitting the front image or the back image to the backend system. In embodiments, the request tag may be included in only one of the document images. Alternatively to step 206a, document upload application 112 may perform step 206b where document upload application 112 transmits the document type request as a separate API call. Backend system 120 may receive the document type request (either received as part of image data at step 206a or as a separate API call at step 206b) and initiate document type detection.

At step 208, document detector 124 may initiate keyword character recognition engine 126a and account character recognition engine 126b in sequential order. For example, document detector 124 may initiate the first character recognition process which may be implemented by either keyword character recognition engine 126a or account character recognition engine 126b. Backend system 120 may determine whether to perform the keyword or account character recognition process based on the request received from document upload application, based on a preference stored in memory of backend system 120, or based on which process has provided more accurate predictions of document types (e.g., determined based on historical data stored in backend system 120). Regardless of which engine is selected first, the result of step 208 is a predicted document type. Keyword character engine 126a provides the predicted document type based on identifying a keyword(s) in the image data and using a mapping to retrieve a document type associated with the keyword(s). Account character recognition engine 126b provides the predicted document type based on identifying the account characters in the image data. The account characters may correspond to a user account that is associated with a particular document type. For example, certain routing numbers on financial documents are associated with particular document types, such as checks, money orders, or savings bonds.

At step 210, document detector 124 initiates the second character recognition engine which is the engine that was not selected at step 208. The output of the second character recognition engine is used to verify the predicted document type from step 208.

In some embodiments, document detector 124 may perform steps 208 and 210 may in parallel, rather than sequentially. Document detector 124 may transmit the image data to both keyword character recognition engine 126a and account character recognition engine 126 without waiting for the results of the keyword character recognition and account character recognition process.

At step 212, document detector 124 determines whether the detected document type is accepted by backend system 120. This determination may include using the account characters to verify the document type generated during step 208 is an accepted document type. For example, if step 208 predicts a document is a check based on keywords located in the image data, step 212 may utilize the account characters, such as a routing number, identified in step 210, to verify the prediction. The term "accepted" in this context may refer to whether the backend system 120 permits a document type to be uploaded, such as to a user account maintained by backend system 120.

At step 214, document detector 124 determines that the detected document type is not accepted by backend system 120. Backend system 120 may transmit a notification to user equipment 110 and a signal to end the current document upload process. The notification may specify that the identified document type is not an accepted document type.

At step 216, document detector 124 determines that the detected document type is accepted by backend system 120. Backend system 120 may permit the document upload process to continue which includes permitting the document to be uploaded to backend system 120 and performing any additional processing of the document as required by the backend system 120. Additional processing may include updating the user account associated with the document upload application with the contents of the uploaded document.

In some embodiments when the step 208 is performed by keyword character recognition engine 126a, step 218 is performed which includes document type model 128 providing a trained model to the keyword character recognition engine. The trained model may include a mapping between any combination of (1) keyword(s) to document types, (2) keyword location(s) to document types, (3) keyword(s) based on the account characters (provided by account character recognition engine 126b), and (4) keyword location(s) based on the account characters. Keyword character recognition engine 126a may utilize the provided mapping to more efficiently detect keywords in the image data and generate a predicted document type based on the detected keywords. The mapping may further increase the confidence in the predicted document type.

As an non-limiting example, a trained model may include a mapping for certain keywords to a "check" document type and the location(s) of those keywords for checks from different issuing banks (i.e., a check from one bank may have keyword(s) identifying the document type in a different location from a check from another bank). In some embodiments, the trained model may also include mappings based on the account characters, such as a routing number that identifies an account associated with the document. The mapping may include information linking keywords to the account identified by the routing number (e.g., that is provided by account character recognition engine 126b).

Components of the System

Figure 3:
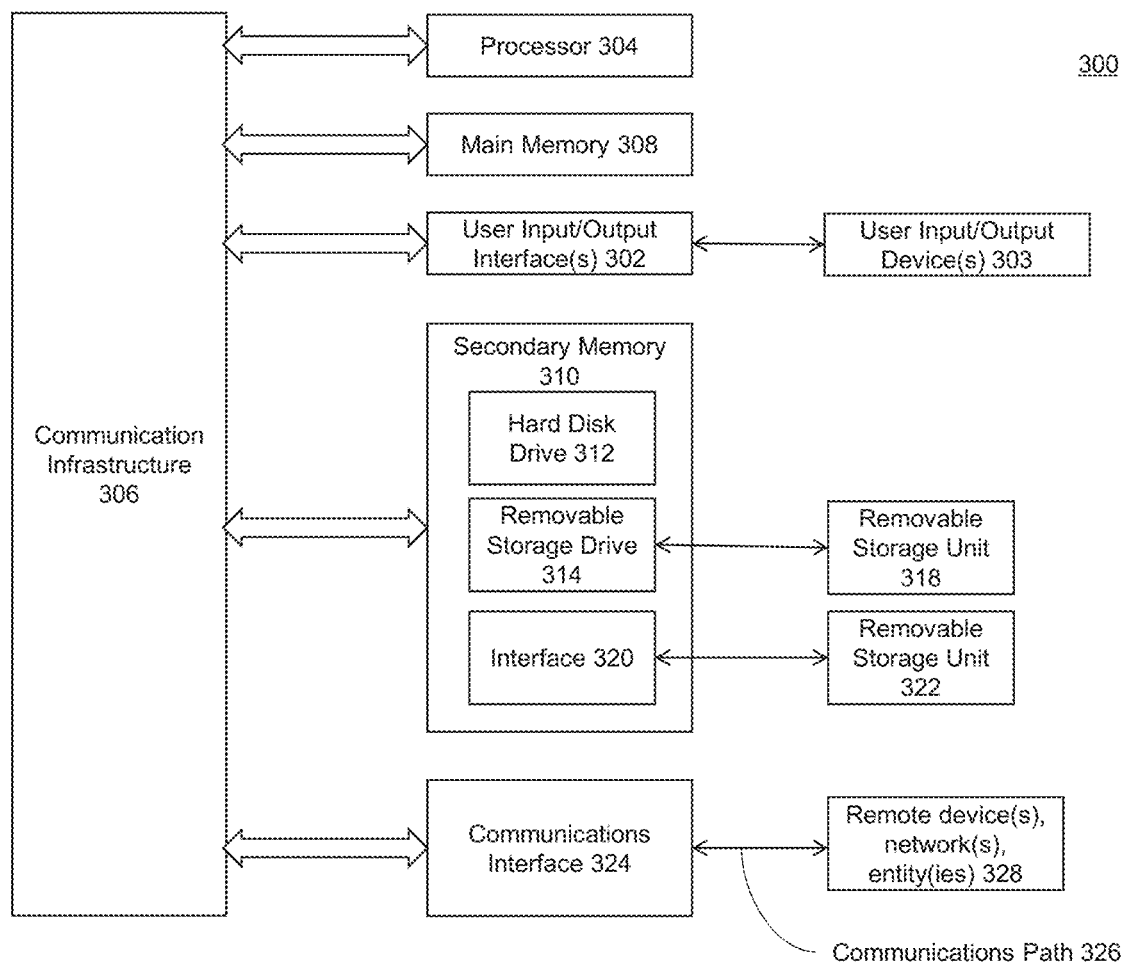
FIG. 3 is an example architecture of devices that can be used to implement the system according to aspects of the present disclosure.

Various embodiments may be implemented, for example, using one or more well-known computer systems, such as computer system 300 shown in FIG. 3. One or more computer systems 300 may be used, for example, to implement any of the embodiments discussed herein, as well as combinations and sub-combinations thereof.

Computer system 300 may include one or more processors (also called central processing units, or CPUs), such as a processor 304. Processor 304 may be connected to a communication infrastructure or bus 306.

Computer system 300 may also include user input/output device(s) 303, such as monitors, keyboards, pointing devices, etc., which may communicate with communication infrastructure 306 through user input/output interface(s) 302.

One or more of processors 304 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 300 may also include a main or primary memory 308, such as random access memory (RAM). Main memory 308 may include one or more levels of cache. Main memory 308 may have stored therein control logic (i.e., computer software) and/or data.

Computer system 300 may also include one or more secondary storage devices or memory 310. Secondary memory 310 may include, for example, a hard disk drive 312 and/or a removable storage device or drive 314. Removable storage drive 314 may be a floppy disk drive, a magnetic tape drive, a compact disk drive, an optical storage device, tape backup device, and/or any other storage device/drive.

Removable storage drive 314 may interact with a removable storage unit 318. Removable storage unit 318 may include a computer usable or readable storage device having stored thereon computer software (control logic) and/or data. Removable storage unit 318 may be a floppy disk, magnetic tape, compact disk, DVD, optical storage disk, and/any other computer data storage device. Removable storage drive 314 may read from and/or write to removable storage unit 318.

Secondary memory 310 may include other means, devices, components, instrumentalities or other approaches for allowing computer programs and/or other instructions and/or data to be accessed by computer system 300. Such means, devices, components, instrumentalities or other approaches may include, for example, a removable storage unit 322 and an interface 320. Examples of the removable storage unit 322 and the interface 320 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 300 may further include a communication or network interface 324. Communication interface 324 may enable computer system 300 to communicate and interact with any combination of external devices, external networks, external entities, etc. (individually and collectively referenced by reference number 328). For example, communication interface 324 may allow computer system 300 to communicate with external or remote devices 328 over communications path 326, which may be wired and/or wireless (or a combination thereof), and which may include any combination of LANs, WANs, the Internet, etc. Control logic and/or data may be transmitted to and from computer system 300 via communication path 326.

Computer system 300 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 300 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 300 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 300, main memory 308, secondary memory 310, and removable storage units 318 and 322, as well as tangible articles of manufacture embodying any combination of the foregoing. Such control logic, when executed by one or more data processing devices (such as computer system 300), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 3. In particular, embodiments can operate with software, hardware, and/or operating system implementations other than those described herein.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The terms "module" or "unit" referred to in this disclosure can include software, hardware, or a combination thereof in an aspect of the present disclosure in accordance with the context in which the term is used. For example, the software may be machine code, firmware, embedded code, or application software. Also for example, the hardware may be circuitry, a processor, a special purpose computer, an integrated circuit, integrated circuit cores, or a combination thereof. Further, if a module or unit is written in the system or apparatus claims section below, the module or unit is deemed to include hardware circuitry for the purposes and the scope of the system or apparatus claims.

The modules or units in the following description of the aspects may be coupled to one another as described or as shown. The coupling may be direct or indirect, without or with intervening items between coupled modules or units. The coupling may be by physical contact or by communication between modules or units.

The above detailed description and aspects of the disclosed environment 100 are not intended to be exhaustive or to limit the disclosed environment 100 to the precise form disclosed above. While specific examples for environment 100 are described above for illustrative purposes, various equivalent modifications are possible within the scope of the disclosed environment 100, as those skilled in the relevant art will recognize. For example, while processes and methods are presented in a given order, alternative implementations may perform routines having steps, or employ systems having processes or methods, in a different order, and some processes or methods may be deleted, moved, added, subdivided, combined, or modified to provide alternative or sub-combinations. Each of these processes or methods may be implemented in a variety of different ways. Also, while processes or methods are at times shown as being performed in series, these processes or blocks may instead be performed or implemented in parallel, or may be performed at different times.

These and other valuable aspects of the aspects of the present disclosure consequently further the state of the technology to at least the next level. While the disclosed aspects have been described as the best mode of implementing environment 100, it is to be understood that many alternatives, modifications, and variations will be apparent to those skilled in the art in light of the descriptions herein. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A computer-implemented method for automatically identifying a document type of a document in an image during a document upload process, the method comprising:
   receiving, from a mobile device, the image comprising image data representing the document, wherein the image data comprises a modified image of the document, and wherein the modified image comprises a request tag;
   responsive to detecting the request tag in the modified image, triggering identification of the document type during the document upload process, wherein the identification of the document type comprises:
   performing, by a first character recognition engine, a first detection process of the image data to detect a keyword in the image data;
   receiving, from a second character recognition engine, a plurality of numeric characters identified in the image data;
   identifying, based on the keyword, the document type of the document;
   performing, based on the plurality of numeric characters, a verification of the identified document type as an accepted document type; and
   transmitting, to the mobile device, a notification regarding the identified document type responsive to the verification indicating whether the identified document type is the accepted document type.

2. The computer-implemented method of claim 1, further comprising:
   proceeding with additional processing of the image data responsive to the verification indicating that the identified document type is the accepted document type.

3. The computer-implemented method of claim 1, wherein the image data includes data representing a magnetic ink character recognition (MICR) line and wherein the plurality of numeric characters represent a routing number associated with the document.

4. The computer-implemented method of claim 3, further comprising:
   transmitting the image data to the second character recognition engine, wherein the second character recognition engine is configured to identify the routing number from the MICR line.

5. The computer-implemented method of claim 1, wherein identifying the document type of the document includes:
   providing the image data including the keyword to a trained machine learning model, wherein the trained machine learning model has been trained, based on (i) training data that includes training image data for a plurality of training documents and training keywords included in the plurality of training documents, and (ii) document types for the plurality of training documents, to generate a mapping between the training data and the document types, such that the trained machine learning model is configured to output the identified document type for the provided image data and keyword.

6. The computer-implemented method of claim 1, wherein performing the verification includes:
   matching the keyword and the plurality of numeric characters to the identified document type.

7. The computer-implemented method of claim 1, wherein the document type is associated with the keyword, and identifying the document type based on the keyword includes:
   comparing the keyword to a plurality of predefined strings, wherein the document type is identified based on a match between the keyword and a predefined string in the plurality of predefined strings.

8. A system for automatically identifying a document type of a document in an image during a document upload process, the system comprising:
   a memory; and
   at least one processor coupled to the memory and configured to:
   receive, from a mobile device, the image comprising image data representing the document, wherein the image data comprises a modified image of the document, and wherein the modified image comprises a request tag;
   responsive to detecting the request tag in the modified image, triggering identification of the document type during the document upload process, wherein the at least one processor is further configured to:
   perform, by a first character recognition engine, a first detection process of the image data to detect a keyword in the image data;
   receive, from a second character recognition engine, a plurality of numeric characters identified in the image data;
   identify, based on the keyword, the document type of the document;
   perform, based on the plurality of numeric characters, a verification of the identified document type as an accepted document type; and
   transmit, to the mobile device, a notification regarding the identified document type responsive to the verification indicating whether the identified document type is the accepted document type.

9. The system of claim 8, wherein the at least one processor is further configured to:
   proceed with additional processing of the image data responsive to the verification indicating that the identified document type is the accepted document type.

10. The system of claim 8, wherein the image data includes data representing a magnetic ink character recognition (MICR) line and wherein the plurality of numeric characters represent a routing number associated with the document.

11. The system of claim 10, wherein the at least one processor is further configured to; transmit the image data to the second character recognition engine, wherein the second character recognition engine is configured to identify the routing number from the MICR line and the first character recognition engine is not configured to identify the routing number from the MICR line.

12. The system of claim 8, wherein to identify the document type of the document, the at least one processor is further configured to:

provide the image data including the keyword to a trained machine learning model, wherein the trained machine learning model has been trained, based on (i) training data that includes training image data for a plurality of training documents and training keywords included in the plurality of training documents, and (ii) document types for the plurality of training documents, to generate a mapping between the training data and the document types, such that the trained machine learning model is configured to output the identified document type for the provided image data and keyword.

13. The system of claim 12, wherein to perform the verification, the at least one processor is further configured to:

match the keyword and the plurality of numeric characters to the identified document type.

14. The system of claim 8, wherein the document type is associated with the keyword and to identify the document type based on the keyword, the at least one processor is further configured to:

compare the keyword to a plurality of predefined strings, wherein the document type is identified based on a match between the keyword and a predefined string in the plurality of predefined strings.

15. A non-transitory computer-readable medium storing instructions for automatically identifying a document type of a document in an image during a document upload process, the instructions, when executed by a processor on a mobile device, cause the processor to perform operations comprising:

receiving, from the mobile device, the image comprising image data representing the document, wherein the image data comprises a modified image of the document, and wherein the modified image comprises a request tag;

responsive to detecting the request tag in the modified image, triggering identification of the document type during the document upload process, wherein the identification of the document type comprises:

performing, by a first character recognition engine, a first detection process of the image data to detect a keyword in the image;

receiving, from a second character recognition engine, a plurality of numeric characters identified in the image data;

identifying, based on the keyword, the document type of the document;

performing, based on the plurality of numeric characters, a verification of the identified document type as an accepted document type; and transmitting, to the mobile device, a notification regarding the identified document type responsive to the verification indicating whether the identified document type is the accepted document type.

16. The non-transitory computer-readable medium of claim 15, the operations further comprising:

proceeding with additional processing of the image data responsive to the verification indicating that the identified document type is the accepted document type.

17. The non-transitory computer-readable medium of claim 15, wherein the image data includes data representing a magnetic ink character recognition (MICR) line and wherein the plurality of numeric characters represent a routing number associated with the document.

18. The non-transitory computer-readable medium of claim 17, the operations further comprising:

transmitting the image data to the second character recognition engine, wherein the second character recognition engine is configured to identify the routing number from the MICR line and the first character recognition engine is not configured to identify the routing number from the MICR line.

19. The non-transitory computer-readable medium of claim 15, wherein identifying the document type of the document includes:

providing the image data including the keyword to a trained machine learning model, wherein the trained machine learning model has been trained, based on (i) training data that includes training image data for a plurality of training documents and training keywords included in the plurality of training documents, and (ii) document types for the plurality of training documents, to generate a mapping between the training data and the document types, such that the trained machine learning model is configured to output the identified document type for the provided image data and keyword.

20. The non-transitory computer-readable medium of claim 15, wherein the document type is associated with the keyword, and identifying the document type based on the keyword includes:

comparing the keyword to a plurality of predefined strings, wherein the document type is identified based on a match between the keyword and a predefined string in the plurality of predefined strings.

\* \* \* \* \*